(12) United States Patent
Slik et al.

(10) Patent No.: US 10,685,128 B2
(45) Date of Patent: Jun. 16, 2020

(54) POLICY DECISION OFFLOAD ACCELERATOR AND ASSOCIATED METHODS THEREOF

(71) Applicant: NETAPP, INC., Sunnyvale, CA (US)

(72) Inventors: David Anthony Slik, Lasqueti Island (CA); James Alan Kelley, Watertown, MA (US); Peter Shah, Somerville, MA (US)

(73) Assignee: NETAPP, INC., Sunnyvale, CA (US)

( * ) Notice: Subject to any disclaimer, the term of this patent is extended or adjusted under 35 U.S.C. 154(b) by 371 days.

(21) Appl. No.: 15/897,594

(22) Filed: Feb. 15, 2018

(65) Prior Publication Data

US 2019/0251273 A1      Aug. 15, 2019

(51) Int. Cl.
   *G06F 21/60*      (2013.01)
   *G06F 21/62*      (2013.01)
   *G06N 20/00*     (2019.01)

(52) U.S. Cl.
   CPC ........ *G06F 21/604* (2013.01); *G06F 21/6218* (2013.01); *G06N 20/00* (2019.01)

(58) Field of Classification Search
   CPC combination set(s) only.
   See application file for complete search history.

(56) References Cited

U.S. PATENT DOCUMENTS

| 7,992,188 B2 * | 8/2011 | Ohta | G06F 21/6209 |
| | | | 705/67 |
| 2007/0022075 A1 * | 1/2007 | Horvitz | G06F 8/35 |
| | | | 706/52 |

FOREIGN PATENT DOCUMENTS

EP      1821234 A2 *  8/2007  ......... G06F 21/6209

OTHER PUBLICATIONS

*EXtensible Access Control Markup Language* (*XACML*) Version 3.0. Jan. 22, 2013. OASIS Standard. http://docs.oasis-open.org/xacml/3.0/xacml-3.0-core-spec-os-en.html.

* cited by examiner

*Primary Examiner* — Lynn D Feild
*Assistant Examiner* — Richard A McCoy
(74) *Attorney, Agent, or Firm* — Klein, O'Neill & Singh, LLP

(57) ABSTRACT

Methods and systems for a networked computing system are provided. One method includes detecting that a processor executable, policy decision point (PDP) has not responded to a request for accessing data associated with a storage system; predicting a response to the request using a machine-learned, request-response association maintained by a processor executable training device; and presenting the predicted response to a processor executable, policy enforcement point (PEP) for granting access to the data and denying access to the data, based on the predicted response.

20 Claims, 10 Drawing Sheets

POLICY DECISION OFFLOAD ACCELERATOR AND ASSOCIATED METHODS THEREOF

TECHNICAL FIELD

The present disclosure relates to managing and implementing policy decisions in a networked, computing environment and more particularly, to a cloud based environment providing storage services.

BACKGROUND

Various forms of storage systems are used today. These forms include direct attached storage (DAS) network attached storage (NAS) systems, storage area networks (SANs), and others. Networked storage systems are commonly used for a variety of purposes, such as providing multiple clients with access to shared data, backing up data and others.

A storage system typically includes at least one computing system executing a storage operating system for storing and retrieving data on behalf of one or more client computing systems ("clients"). The storage operating system typically stores and manages shared data containers in a set of mass storage devices.

Storage systems are used in virtual environments where a physical resource is time-shared among a plurality of independently operating processor executable virtual machines. Cloud computing with virtual machines also continues to grow in popularity. Cloud computing in this context means computing capability that provides an abstraction between a computing resource and its underlying technical and physical architecture (e.g., servers, storage, networks), enabling convenient, on-demand network-based access to a shared pool of configurable computing resources that can be rapidly provisioned and released with minimal management effort or service provider interaction.

To efficiently provide cloud services, various resources within the cloud environment should be configured to efficiently make policy decisions. Continuous efforts are being made to efficiently implement policies in the cloud computing environment.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a hardware-based processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

In one aspect, as described in detail below, methods and systems for a networked computing system are provided. One method includes detecting that a processor executable, policy decision point (PDP) has not responded to a request for accessing data associated with a storage system; predicting a response to the request using a machine-learned, request-response association maintained by a processor executable training device; and presenting the predicted response to a processor executable, policy enforcement point (PEP) for granting access to the data and denying access to the data, based on the predicted response.

Figure 1:
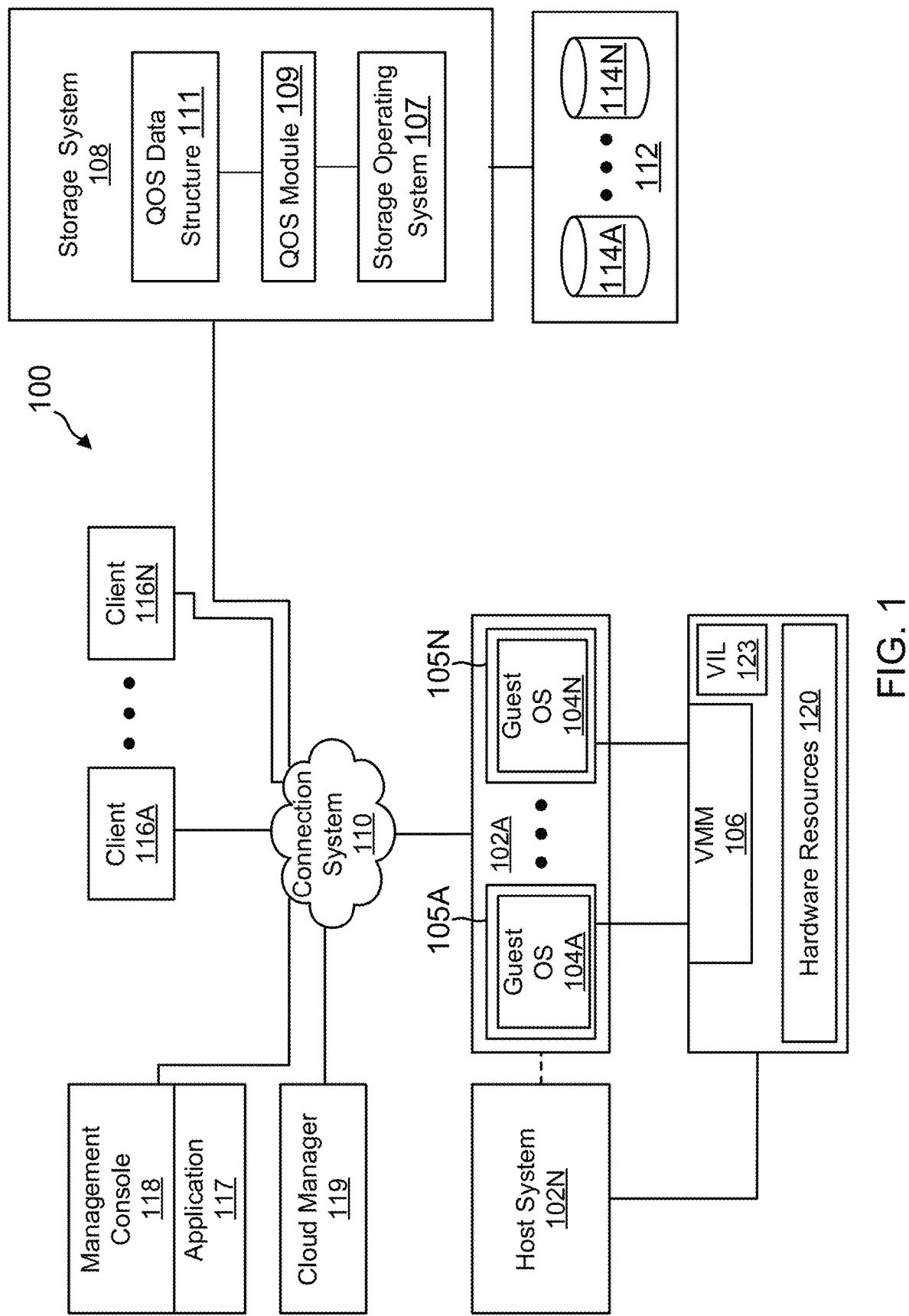
FIG. 1 shows an example of an operating environment for the various aspects disclosed herein.

System 100: FIG. 1 shows an example of a system 100, for implementing a policy management system, according to one aspect of the present disclosure. As an example, system 100 includes a virtual machine environment where a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on a physical computing system (may also be referred to as a host platform/system) which may be referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host system.

In one aspect, system 100 may include a plurality of computing systems 102A-102N (may also be referred to as host platform(s)/system(s) 102 or simply as server(s) 102) communicably coupled to a storage system 108 executing a storage operating system 107 via a connection system 110 such as a local area network (LAN), wide area network (WAN), the Internet and others. As described herein, the term "communicably coupled" may refer to a direct connection, a network connection, or other connections to enable communication between devices.

Host system 102A may include a virtual machine environment where a plurality of VMs 105A-105N are executed and presented to client computing devices/systems 116A-116N. VMs 105A-105N execute a plurality of guest OS 104A-104N (may also be referred to as guest OS 104) that share hardware resources 120. As described above, hardware resources 120 may include storage, CPU, memory, I/O devices or any other hardware resource.

In one aspect, host system 102A interfaces with a virtual machine monitor (VMM) 106, for example, a processor executed Hyper-V layer provided by Microsoft Corporation of Redmond, Wash., a hypervisor layer provided by VMWare Inc., or any other type. VMM 106 manages the plurality of guest OS 104A-104N executed by the host system 102A. The VMM 106 may include or interface with a virtualization layer (VIL) 123 that provides one or more virtualized hardware resource 120 to each OS 104A-104N.

In one aspect, VMM 106 is executed by the host system 102A with VMs 105A-105N. In another aspect, VMM 106 may be executed by an independent stand-alone computing system, often referred to as a hypervisor server or VMM server and VMs 105A-105N are presented at one or more host computing systems.

It is noteworthy that different vendors provide different virtualization environments, for example, VMware Corporation, Microsoft Corporation and others. Data centers may have hybrid virtualization environments/technologies, for example, Hyper-V and hypervisor based virtual environment. The generic virtualization environment described above with respect to FIG. 1 may be customized depending on the virtual environment to implement the aspects of the present disclosure. Furthermore, VMM 106 (or VIL 123) may execute other modules, for example, a storage driver, network interface and others, the details of which are not germane to the aspects described herein and hence have not been described in detail.

System 100 may also include a management console 118 that executes a processor executable management application 117 for managing and configuring various elements of system 100. Application 117 may be used to manage and configure VMs as well as configure resources that are used by VMs, according to one aspect. Application 117 may also be used to establish policies that are provided to a policy decision point (PDP 332, FIG. 3B) of a policy management system (301, FIG. 3B). The policies are used for granting or denying access requests, as described below in detail.

It is noteworthy that although a single management console 118 is shown in FIG. 1, system 100 may include other management consoles for performing different functions, for example, managing storage systems, managing network connections and other functions. The innovative aspects described herein are not limited to any specific number of management consoles.

In one aspect, system 100 includes a cloud manager 119 that is presents and manages cloud/storage resources, as described below with respect to FIG. 2B.

In one aspect, storage system 108 has access to a set of mass storage devices 114A-114N (may also be referred to as storage devices 114) within at least one storage subsystem 112. The mass storage devices 114 may include writable storage device media such as magnetic disks, video tape, optical, DVD, magnetic tape, non-volatile memory devices for example, solid state drives (SSDs) including self-encrypting drives, flash memory devices and any other similar media adapted to store information. The storage devices 114 may be organized as one or more groups of Redundant Array of Independent (or Inexpensive) Disks (RAID). The various aspects disclosed are not limited to any particular storage device type or storage device configuration.

In one aspect, the storage system 108 provides a set of logical storage volumes (or logical unit numbers (LUNs) for a storage area network (SAN)) to VMM 106 that presents storage space to VMs 105A-105N. Each volume may be configured to store data files (or data containers or data objects), scripts, word processing documents, executable programs, and any other type of structured or unstructured data. From the perspective of one of the client systems, each volume can appear to be a single drive. However, each volume can represent storage space in at one storage device, an aggregate of some or all of the storage space in multiple storage devices, a RAID group, or any other suitable set of storage space.

The storage operating system 107 organizes storage space at storage devices 114 as one or more "aggregate", where each aggregate is identified by a unique identifier and a location. Within each aggregate, one or more storage volumes are created whose size can be varied. A qtree, sub-volume unit may also be created within the storage volumes. As a special case, a qtree may be an entire storage volume.

The storage system 108 may be used to store and manage information at storage devices 114 based on client requests. The requests are processed based on policies that are managed by the policy management system 301, described below in detail. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols, for example, the Small Computer Systems Interface (SCSI) protocol encapsulated over TCP (iSCSI) and SCSI encapsulated over Fibre Channel (FCP). The adaptive aspects described herein are not limited to any specific request type or request protocol.

In a typical mode of operation, a client (for example, a VM) transmits one or more input/output (I/O) requests, such as a CFS or NFS request, over connection system 110 to the storage system 108. Storage system 108 receives the requests, and based on certain policies, issues one or more I/O commands to storage devices 114 to read or write the data on behalf of the client system, and issues a CIFS or NFS response containing the requested data over the network 110 to the respective client system. The policies for handling the requests are implemented using the policy management system described below in detail.

Although storage system 108 is shown as a stand-alone system, i.e. a non-cluster based system, in another aspect, storage system 108 may have a distributed architecture; for example, a cluster based system that is described below in detail with respect to FIG. 2A.

Storage system 108 may also include a quality of service (QOS) module 109 that interfaces with or is a part of the storage operating system 107 for implementing QOS policies using one or more QOS data structure 111. As an example, the QOS policies may be set using the management application 117 using service level agreements and managed by the policy management system 301. QOS module 109 may be used to implement a guaranteed latency and/or a throughput rate for processing input/output (I/O) requests. The term guaranteed latency as used herein means that a VM or client is guaranteed that an I/O request will be processed within certain duration. The term guaranteed throughput as used herein means a guaranteed number of IOPS (input/output operations per second) that are processed for a client. Throughput may be expressed as an absolute value or as a percentile metric (for example, a certain percentage of the total number of requests).

QOS module 109 stores QOS data at data structure 111. The data structure 111 identifies each storage volume and the associated latency and throughput. QOS module 109 provides this information to the storage operation system 107 such that storage operating system 107 can prioritize and process I/O requests based on the latency and throughput rates associated with the storage volumes. The storage operating system 107 maintains a plurality of queues (not shown) for providing QOS for each storage volume.

Clustered System: FIG. 2A shows a cluster based storage environment 200 having a plurality of nodes for managing storage devices for providing storage services for client systems via a cloud computing environment, according to one aspect. Storage environment 200 may include a plurality of client systems 204.1-204.N, a clustered storage system 202 (similar to storage system 108), management console 118 and at least a network 206 communicably connecting the client systems 204.1-204.N and the clustered storage system 202.

The clustered storage system 202 includes a plurality of nodes 208.1-208.3, a cluster switching fabric 210, and a plurality of mass storage devices 212.1-212.3 (may also be referred to as 212 and similar to storage device 114). Each of the plurality of nodes 208.1-208.3 is configured to include a network module (N-module), a storage module (a D-module), and a management module (M-module), each of which can be implemented as a processor executable module. As an example, node 208.1 includes an N-module 214.1, a D-module 216.1, and an M-Module 218.1, node 208.2 includes an N-module 214.2, a D-module 216.2, and an M-Module 218.2, and node 208.3 includes an N-module 214.3, a D-module 216.3, and an M-Module 218.3.

The N-modules 214.1-214.3 include functionality that enable the respective nodes 208.1-208.3 to connect to one or more of the client systems 204.1-204.N over the computer network 206. The N-modules handle file network protocol processing (for example, CFS, NFS and/or iSCSI requests based on policies managed by the policy management system 301). The D-modules 216.1-216.3 connect to one or more of the storage devices 212.1-212.3 and process I/O requests. Accordingly, each of the plurality of nodes 208.1-208.3 in the clustered storage server arrangement provides the functionality of a storage server.

The M-Modules 218.1-218.3 provide management functions for the clustered storage system 202. The M-Modules 218.1-218.3 collect storage information regarding storage devices 212 and makes it available management console 118. The M-Modules may also be used to configure QOS values (e.g. latency and throughput) for storage volumes that are managed by a node.

A switched virtualization layer including a plurality of virtual interfaces (VIFs) 219 is provided to interface between the respective N-modules 214.1-214.3 and the client systems 204.1-204.N, allowing storage 212.1-212.3 associated with the nodes 208.1-208.3 to be presented to the client systems 204.1-204.N as a single shared storage pool.

The clustered storage system 202 can be organized into any suitable number of virtual servers (may also be referred to as "VServers" or virtual storage machines), in which each VServer represents a single storage system namespace with separate network access. Each VServer has a specific client domain and a security domain that are separate from the client and security domains of other VServers. Moreover, each VServer is associated with one or more VIFs 219 and can span one or more physical nodes, each of which can hold one or more VIFs and storage associated with one or more VServers. Client systems 204 can access the data on a VServer from any node of the clustered system, through the VIFs associated with that VServer, based on policies that are managed by the policy management system 301. It is noteworthy that the aspects described herein are not limited to the use of VServers.

Each of the nodes 208.1-208.3 is defined as a computing system to provide application services to one or more of the client systems 204.1-204.N. The nodes 208.1-208.3 are interconnected by the switching fabric 210, which, for example, may be embodied as an Ethernet switch or any other type of switch/connecting device.

Figure 2A:
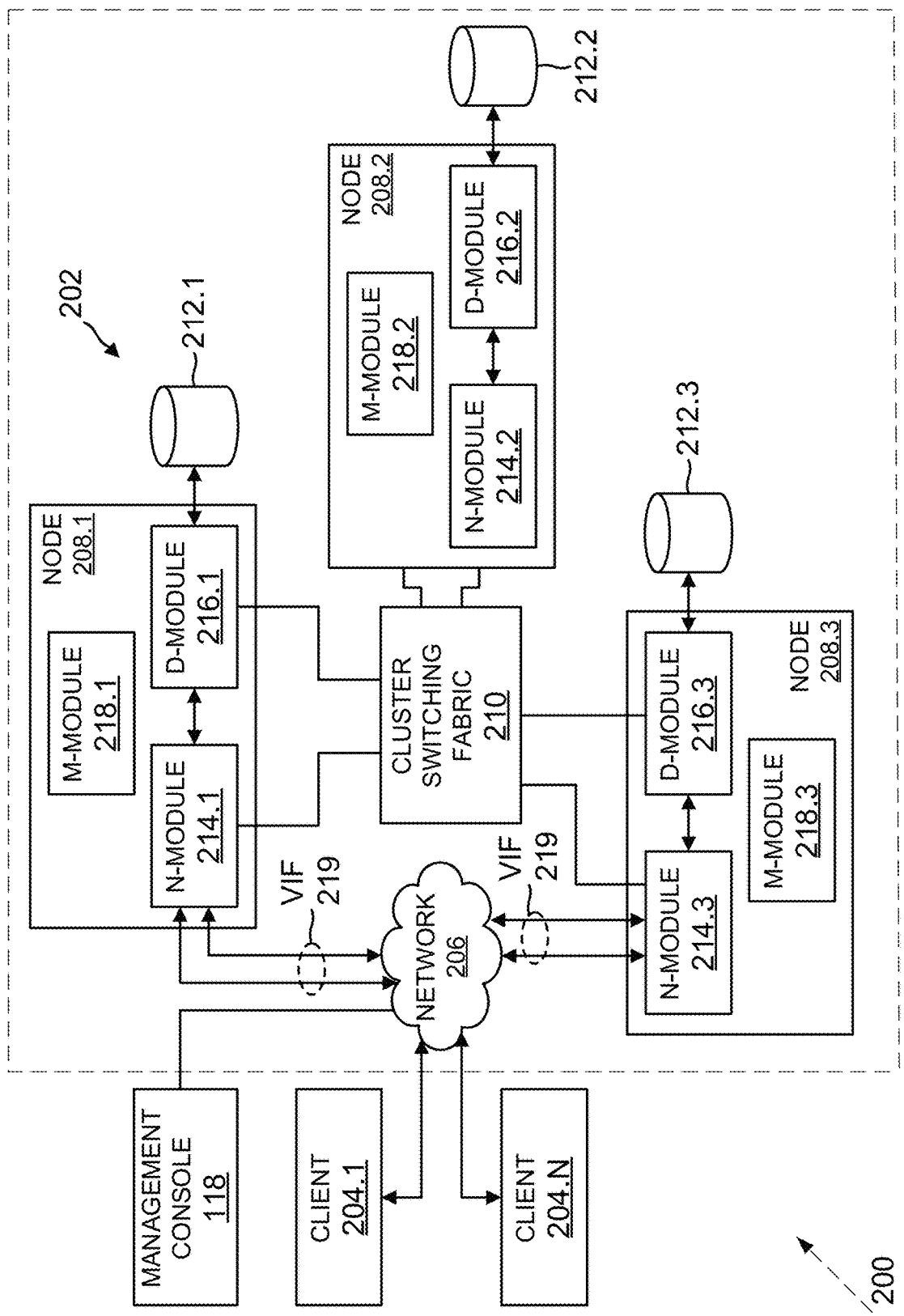
FIG. 2A shows an example of a networked, clustered storage system, used according to one aspect of the present disclosure.
Figure 2B:
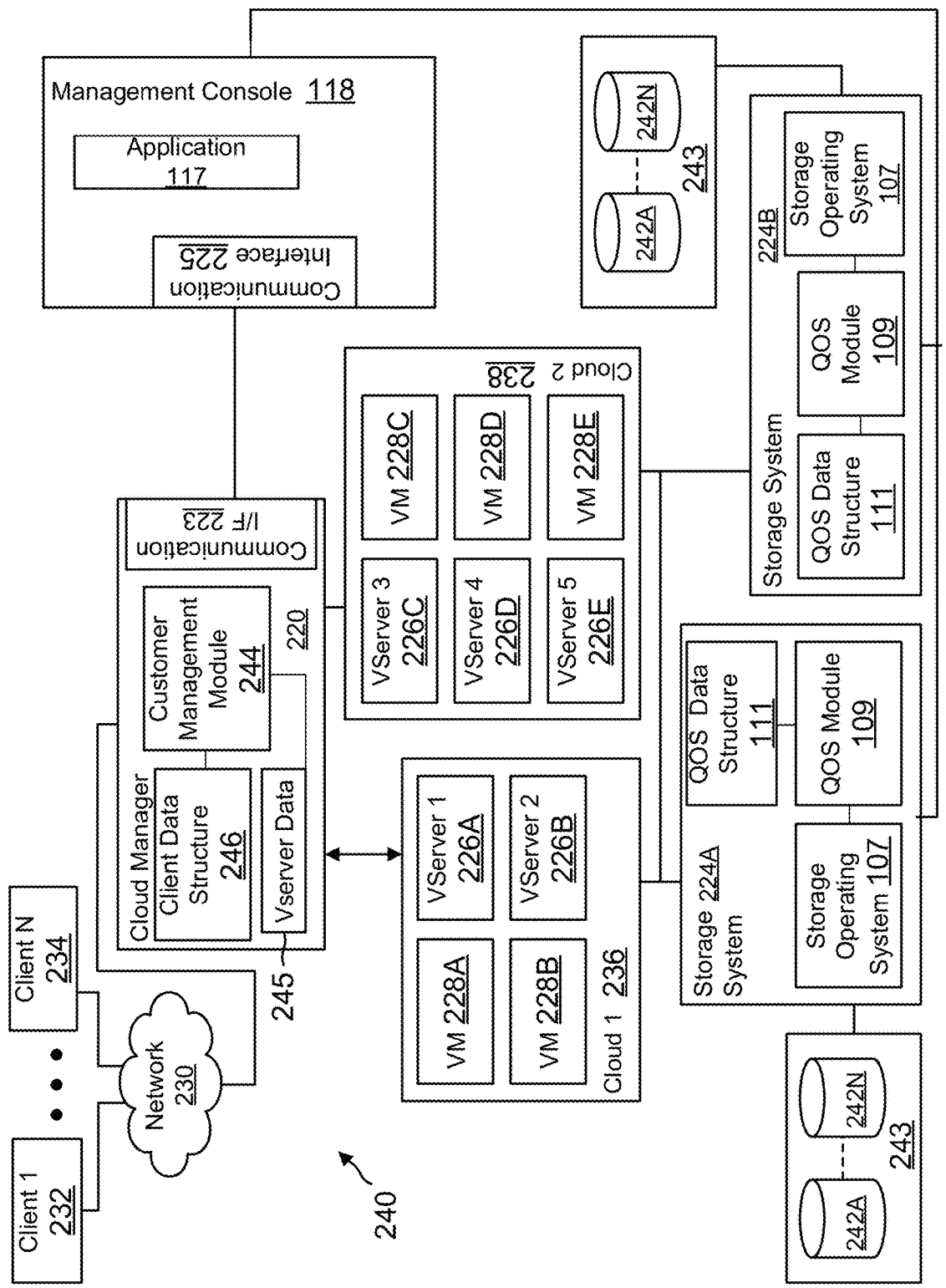
FIG. 2B shows an example of a storage system in a cloud computing environment, according to one aspect of the present disclosure.

Although FIG. 2A depicts an equal number (i.e., 3) of the N-modules 214.1-214.3, the D-modules 216.1-216.3, and the M-Modules 218.1-218.3, any other suitable number of N-modules, D-modules, and M-Modules may be provided. There may also be different numbers of N-modules, D-modules, and/or M-Modules within the clustered storage system 202. For example, in alternative aspects, the clustered storage system 202 may include a plurality of N-modules and a plurality of D-modules interconnected in a configuration that does not reflect a one-to-one correspondence between the N-modules and D-modules. In another aspect, the clustered storage system 202 may only include one N-module and D-module.

Each client system 204.1-204.N may request the services of one of the respective nodes 208.1, 208.2, 208.3, and that node may return the results of the services requested by the client system by exchanging packets over the computer network 206, which may be wire-based, optical fiber, wireless, or any other suitable combination thereof.

Cloud Environment: FIG. 2B shows one or more storage systems (224A/224B) analogous to storage system 108/202 for providing storage services in a cloud-based environment 240, according to one aspect of the present disclosure. In one aspect, cloud environment 240 may be a computing environment configured to enable network access (e.g., on-demand access) to a shared pool of configurable computing resources (e.g., networks, storage, host servers, applications, and services) using one or more policies managed by the policy management system 301, described below in detail. In one or more aspects, a storage system may be a hardware resource configured to host one or more VServers in the cloud environment 240.

Storage system 224A and storage system 224B may be deployed by a cloud manager 220 (similar to 119, FIG. 1) and/or a cloud administrator configured to provision the host systems, storage associated with one or more client devices (e.g., client 1 232, client N 234) and/or services requested by the one or more client devices based on various policies that are customized for different clients and applications. As an example, storage system 224A may be configured to be associated with VServer 1 226A and VServer 3 226C, while storage system 224B may be configured to be associated with VServer 2 226B, VServer 4 226D and VServer 5 226E.

In one or more aspects, cloud manager 220 may enable one or more client devices to provision computing resources thereof. The cloud manager 220 may manage cloud portion(s) (e.g., cloud 1 236, cloud 2 238) associated with client 1 232 and client N 234, respectively. The cloud manager 220 also communicates with the management console 118 using communication interface 223, while the management console 118 uses communication interface 225.

In one aspect, the cloud manager 220 maintains client information using a client data structure 246. The client data structure 246 identifies a client and the various service that are available for client systems. A customer management module 244 may provide APIs for receiving instructions to add, modify or delete client information.

The cloud manager 220 also maintains VServer data 245 includes a listing of VServers that are assigned to each client/VM. It is noteworthy that each cloud may have its own storage administrator that may store VServer data 245. The various aspects described herein are not limited to which entity maintains and updates VServer data.

Client 1 232 and/or client N 234 may log into a console associated with cloud manager 220 to access cloud 1 236 and/or cloud 2 238 (and the VMs 228A-228E therein) through a public network 230 (e.g., Internet). The client devices and/or VMs associated therewith provided in cloud environment 240 may be analogous to the clients of FIGS. 1/2A.

In order to address storage requirements/requests associated with client 1 232 and client N 234, cloud manager 220 may be configured to appropriately provision VServer 1 226A, VServer 2 226B, VServer 3 226C, VServer 4 226D and VServer 5 226E and then allocate the appropriate VServer to client 1 232 and client N 234. The aforementioned VServers may be virtualized entities utilized by client 1 232 and client N 234 to meet storage requirements thereof. Multi-tenancy may allow for a storage system to have multiple VServers associated therewith. A portion of the cloud (e.g., cloud 1 236) including VServer 1 226A, VServer 2 226B and virtual machines (e.g., VM 228A, VM 228B) associated therewith, may be associated with client 1 232, and a portion of the cloud (e.g., cloud 2 238) including VServer 3 226C, VServer 4 226D and VServer 5 226E and VMs (e.g., VM 228C, VM 228D, VM 228E) associated therewith, may be associated with client N 234.

The aforementioned cloud portions may be logical subsets of the cloud and may include VMs implemented with operating systems (e.g., Linux, Microsoft®'s Windows®). "Cloud" as used herein may refer to the large pool of configurable computing resources (e.g., virtualized computing resources) that may be subjected to a pay-per-use model, in which client(s) may enter into service agreement(s) with service provider(s). The portion of the "cloud," therefore, may refer to the pool of resources associated with a particular client. It is noteworthy that client 1 232 and/or client N 234 may be entities (e.g., corporations, departments and others), and there may be a number of computing devices associated with each of client 1 232 and/or client N 234.

Cloud 1 236 and/or cloud 2 238 may span across several geographic regions. In one or more aspects, the aforementioned cloud portions may span multiple countries under differing jurisdictional guidelines. For example, a jurisdictional guideline may deem that a VServer needs to be launched on hardware (e.g., storage system) located in the same jurisdiction as the corresponding client(s).

In one or more aspects, administrators of cloud environment 240 may possess the authority to launch one or more VServers on any of storage system 224A and storage system 224B, irrespective of the location(s) thereof. An administrator may also modify the version of the storage operating system and/or configuration settings on storage system 224A and/or storage system 224B. In another example, an administrator may provision a VServer on a storage system offering lower performance and/or located in a geographic region different from that of a client device.

QOS module 109 maintains the QOS data structure 111 at each storage system. The QOS data structure 111 identifies each storage volume (or LUN or virtual volume (vvol)) 242A-242N of a storage sub-system 243. The QOS data structure 111 stores a target latency and throughput rate that is associated with each volume. The target rates may be associated during storage volume/VServer configuration using a management application using one or more policies that are managed by the policy management system 301, described below.

Figure 3A:
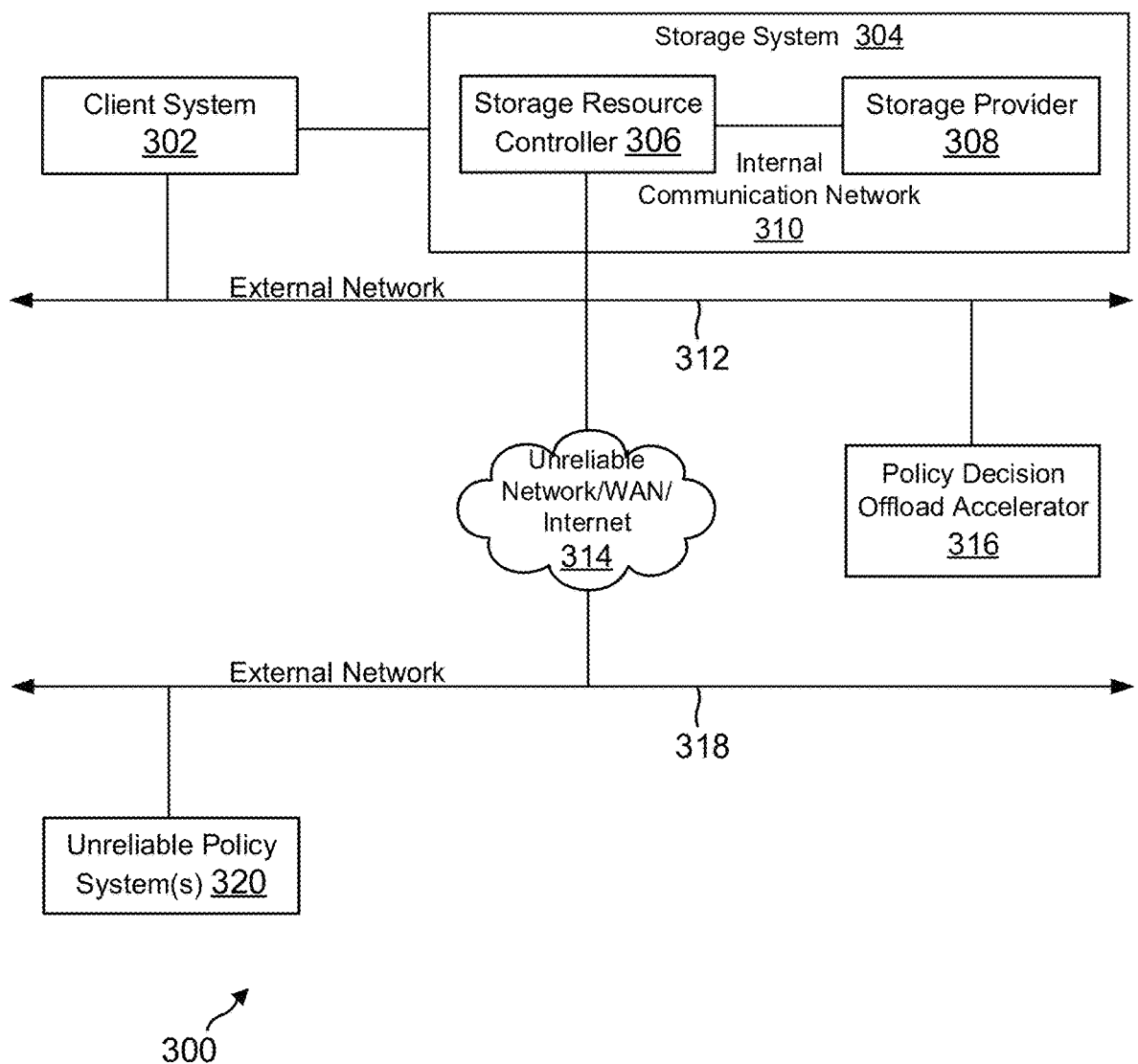
FIG. 3A shows a high level block diagram of a system for managing policies, according to one aspect of the present disclosure.

Policy Environment 301: FIG. 3A shows a high-level block diagram of a policy environment/system 300 using the various aspects of the present disclosure. It is noteworthy that system 300 may use the various components described above with respect to FIGS. 1-2A-2B, including client systems, host systems, storage systems, cloud managers/providers and other resources. The adaptive aspects, however, are not limited to specific components/modules.

System 300 includes a resource user 302 (for example, a client system) that uses one or more resources, for example, the storage system 304. The storage system 304 may be similar to storage systems 108/202/224A/224B, described above in detail. The storage system 304 includes a storage provider 308 (for example, the storage operating system 107) that are available via a storage resource controller 306 (for example, a software layer, a "FPolicy" layer that enables an external program to be notified if there is a read/write operation). The storage resource controller 306 communicates with the resource provider 308 via an internal, communication network 310.

An external communication network 312 connects the resource controller 306 to an unreliable, communication network 314 (for example, the Internet, a WAN or any other network type). An unreliable policy system 320 (for example, a server) is coupled to network 314 via an external network 318. It is noteworthy that external networks 312, 314 and 318 are shown simply as examples, the adaptive aspects of the present disclosure may be implemented using fewer or more networks.

In one aspect, innovative technology for a policy decision offload accelerator (may also be referred to as "accelerator") 316 is provided. Accelerator 316 may be implemented at a dedicated computing device or integrated into other systems, for example, within storage system 304. The structure and functionality of the accelerator 316 are described below with respect to FIGS. 3B-3C, and the process flow charts of FIGS. 4A-4B, according to one aspect of the present disclosure.

Figure 3B:
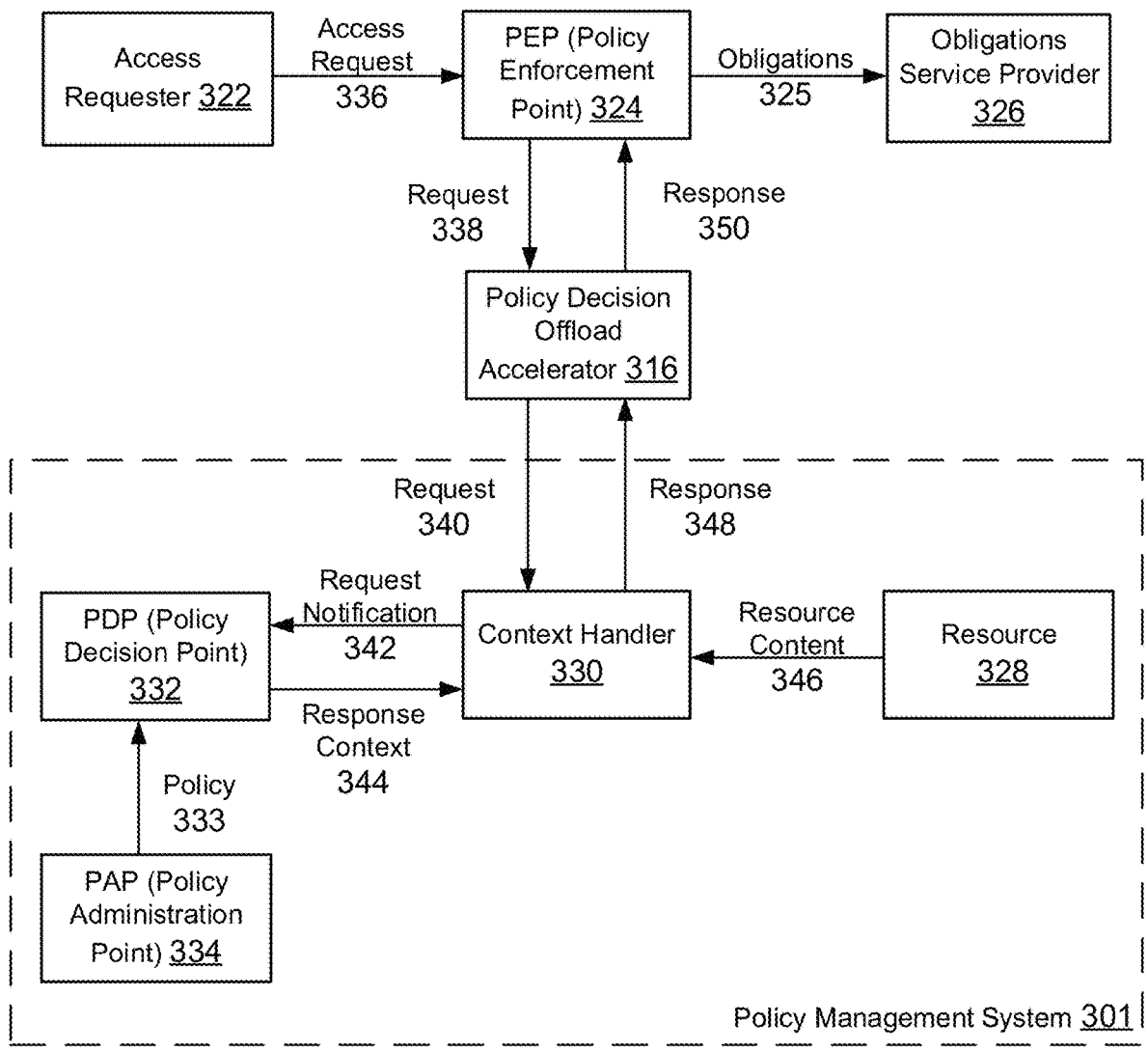
FIG. 3B shows a system with a policy decision offload accelerator, according to one aspect of the present disclosure.

Policy Management System: FIG. 3B shows an example of a modified XACML data flow model for using the accelerator 316 with a policy management system 301 (similar to 320, FIG. 3A), according to one aspect of the present disclosure. XACML is a published industry standard specification that stands for "eXtensible Access Control Markup Language." XACML provides an architecture, and a processing model for evaluating access requests according to rules defined by certain policies. XACML is intended to promote common terminology and interoperability between access control implementations for different vendors providing different hardware and software components within a computing environment. XACML 1 primarily an attribute based access control system (ABAC), where attributes associated with a user or action or a resource are inputs for a decision of whether a given user may access a given resource in a specific manner.

The XACML standard provides a distributed policy decision and enforcement system, but has disadvantages. For example, a policy enforcement point (PEP) requests decisions from a policy decision point (PDP) that makes decisions based on a request and stored policies. If the PEP loses connection with the PDP, it can result in denial of service because policy decisions cannot be made. This can slow down processing of client requests and hence, is undesirable. Furthermore, since most of the work is concentrated in the PDP, it is difficult to scale the infrastructure for making policy decisions. The accelerator 316 of the present disclosure, when added to the XACML architecture solves this problem, as described below in detail.

Referring now to FIG. 3B, an access requester 322 (for example, a client system 116 (FIG. 1) or 302 (FIG. 3A)) sends a request 336 to a PEP 324. The PEP intercepts the access request and provides the request (shown as 338) to accelerator 316 (instead of a PDP 332 in a standard XACML implementation)) to obtain an access decision (i.e. access to a resource is either approved or rejected).

During normal operations i.e., when the PDP 332 and PEP 324 are operational and communicating, the accelerator 316 forwards the request 338 to a context handler 330 (shown as 340). The context handler 330 retrieves any resource content 346 that are needed to process the request from a resource 328. The context handler 330 then provides a request notification 342 to the PDP 332.

The PDP 332 is managed by a policy administration point (PAP) 334 that manages access authorizations using policies 333. PAP 334 may be a management console (118, FIG. 1) that may be used to set policies 333. The PDP 332 provides a response context 344 to the context handler 330. The context handler 330 then generates a response that is provided to PEP 324 (shown as 348 and 350, respectively). The PEP 324 then issues specific obligations (i.e. commands) 325 to an obligations service provider 326 (for example, the storage operating system 107) to either allow or deny the request.

In one aspect, as an example, access requester 322 may be a client system 116 (FIG. 1). The PEP 324 may be a software layer that is executed by the storage system 108 that enables/allows another, processor executable, software program to be notified when a read and write occurs. The software layer may interface or is integrated with the storage operating system 107. The obligations service (provider) 326 may be a storage controller. A context handler 330 may be an application, for example, a virus scanning program or any other program. A resource 328 may be programmed instructions, data structures or any other component that is needed by the context handler 330. PAP 334 may be the management console 118 used by a storage administrator or a cloud manager. The PDP 332 may be a computing system or a data structure used for storing policies that are used for making decisions, in response to access requests. It is noteworthy that the examples provided herein are simply to illustrate the different entities that may be used to implement the architecture of FIG. 3B and the various aspects of the present disclosure are not limited to any specific examples.

Figure 3C:
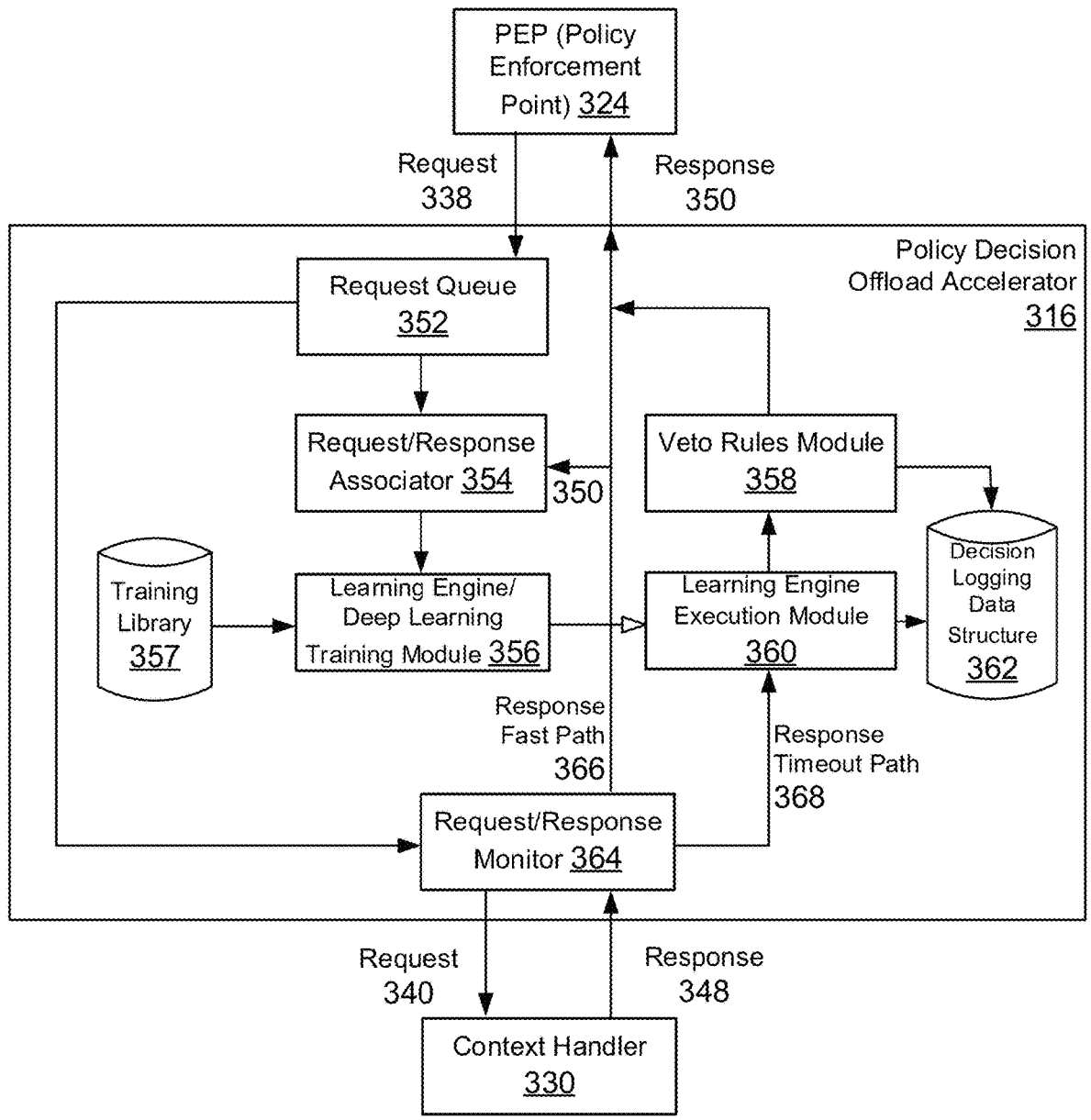
FIG. 3C shows a block diagram of the policy decision offload accelerator, according to one aspect of the present disclosure.

Accelerator 316: FIG. 3C shows a detailed block diagram of the accelerator 316, according to one aspect of the present disclosure. Accelerator 316 includes a request queue 352 that is used to temporarily store a request 338 received from PEP 324. The request queue 352 may be located at a non-volatile memory or any other storage device type. The request 338 is also provided to a processor executable, request/response associator (may be referred to as "associator") 354 that also receives a response 350 provided to PEP 324. The associator 354 generates a relationship between a request and a response and provides the same to a learning engine training module (may also be referred to as "training module") 356. The training module 356 receives an initial training library 357 with initial request/response associations. The training module 356 continues to machine-learn request/response associations as the policy management system 301 is used to respond to various requests.

The request 338 from the request queue 352 is also provided to a request/response monitor (may also be referred to as "monitor") 364. Monitor 364 forwards the request to the context handler 330. When a response is received (348) using PDP 332 within a certain duration, then the response 350 is provided to PEP 324 via a fast path 366.

If a response 348 is not received from the context handler 330 within a certain duration, then the response is handled by using timeout path 368. In the timeout path 368, the request is provided to a learning execution module 360 that uses the training module 356 to predict a response based on machine learning involving request/response associations. The predicted response is evaluated by a processor-executable, veto rules module 358, using any veto rule that may have been configured for the system. In one aspect, an administrator may establish default rules during system configuration and the predicted response is evaluated against the default rules. If the predicted response is vetoed, then access is denied. The decision from the veto rules module 358 is stored in a decision logging data structure 362 for future use.

In one aspect, decisions are rated on risks and confidence. Depending on company policy, high risk decisions could be denied, e.g. by the veto rules, even if the learning engine execution module 360 believes high confidence decisions should be allowed. Similarly, low confidence decisions may be denied, even though the learning engine execution module 360 determines that the decision is low risk.

In one aspect, the training module 356 operates as an "edge decision trainer" which trains the "decider", the learning engine execution module 360. Since this can occur anywhere within the information technology infrastructure, it does not place any additional load on the overall policy system infrastructure.

Figure 4A:
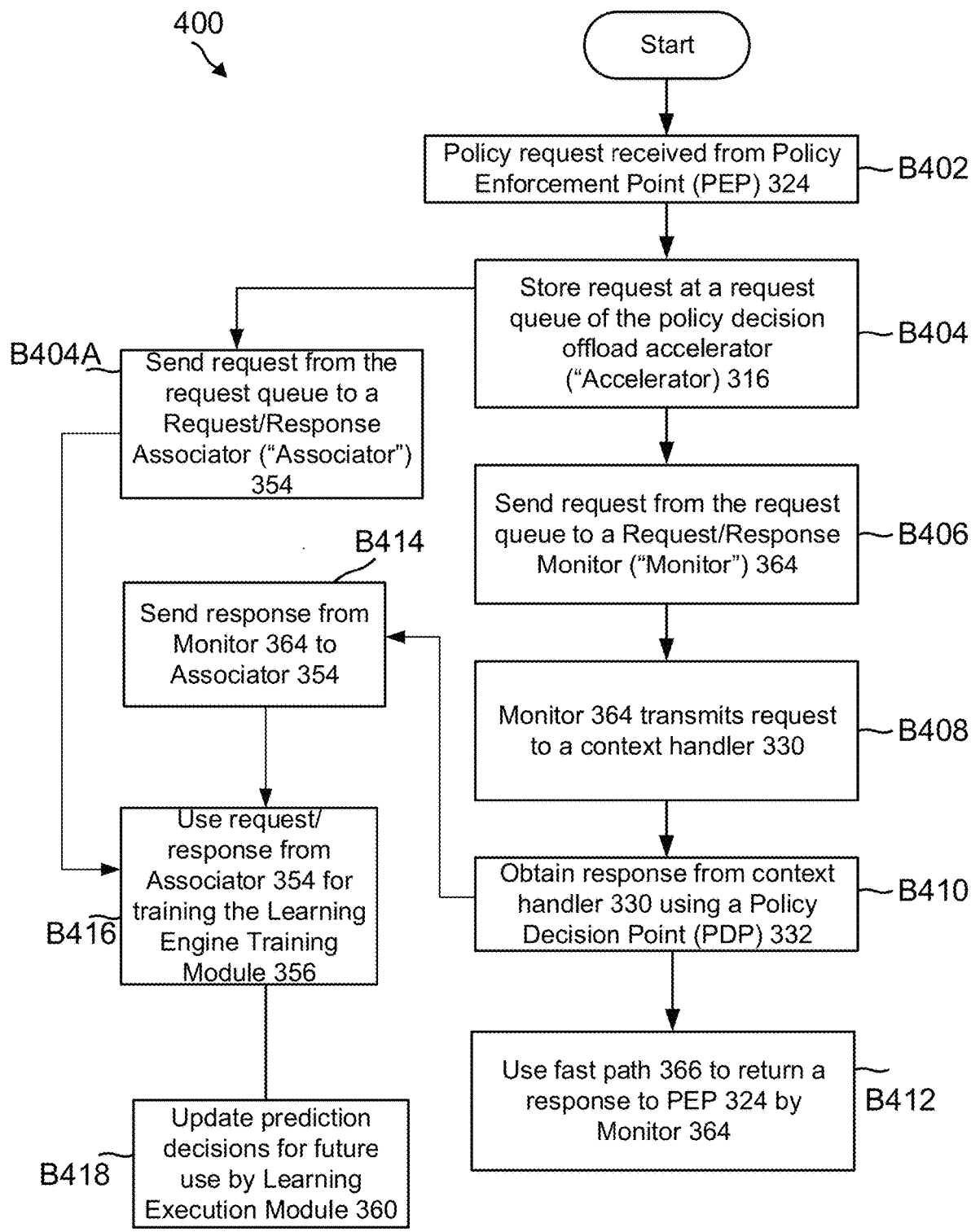
FIG. 4A shows an example of a process flow chart for handling policy decisions using a fast path, according to one aspect of the present disclosure.

Process Flows: FIG. 4A shows a process flow 400 for using the policy management system 301 and the accelerator 316, according to one aspect of the present disclosure. Process 400 uses the fast path 366, when PEP 324 and PDP 332 are operational and connected. Process 400 is described with respect to the various components of FIGS. 3A-3C, described above in detail.

In block B402, a request 338 is received by the accelerator 316 that involves a policy, for example, whether a client or an application be allowed a certain type of access to information. For example, the policy request may involve a request to read, write, delete, copy, move information stored as a file, or as an object, obtain status or performance parameters or any other request type. The various aspects described herein are not limited to any specific request type. The received request is first stored at the request queue 352 of accelerator 316, in block B404. The received request from the request queue 352 is also sent to the associator 354 in block B404A and in parallel, in block B406, to the monitor 364.

In block B408, the monitor 364 sends the request to the context handler 330. If the context handler 330 returns a response 348 within a certain duration in block B410 using the PDP 332, then the response is sent to the PEP 324 in block B412 via the fast path 366 and also to the associator 354, in block B414 (shown as 350).

In block B416, the training module 356 takes the request and response from the associator 354 and trains the training module 356 using the training library 357. Based on the training, a predictive decision is updated by the learning engine execution module 360 for future use in block B418, as described below with respect to process 420.

Figure 4B:
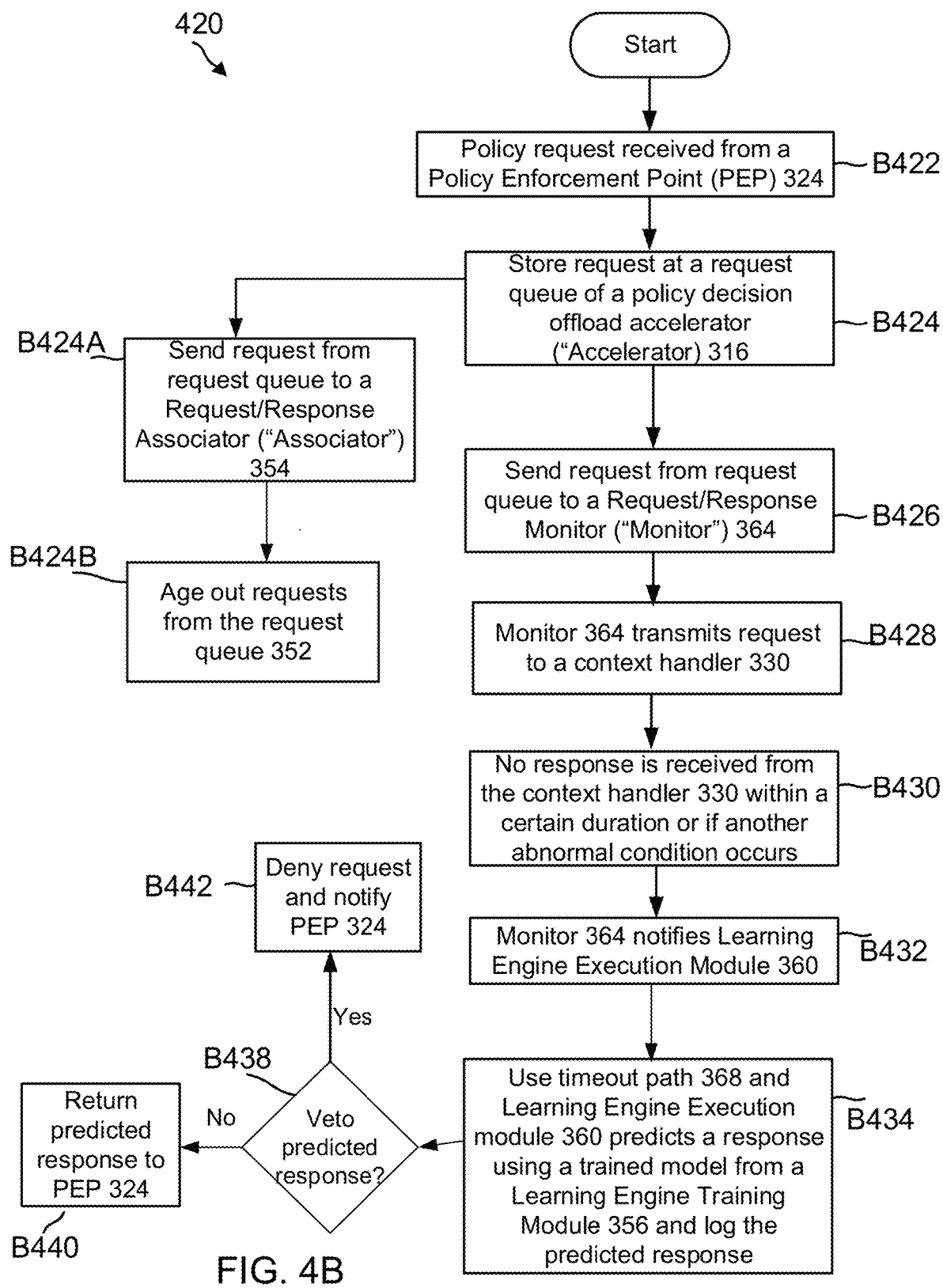
FIG. 4B shows an example of a process flow chart for handling policy decisions using a slow path, according to one aspect of the present disclosure.

FIG. 4B shows the process flow 420 for using the timeout path 368 when the PDP 332 is unavailable, unable or overloaded to accept or deny a request, according to one aspect of the present disclosure. Process block B422 is similar to block B402, process block B424 is similar to block B404, process block B424A is similar to block B404A, process block B426 is similar to block B406, while process block B428 is similar to block B408, and for brevity sake, the similar process blocks are not described again.

Block B424B, involves removing the request from the request queue 352, after a certain duration. This improves storage efficiency because "older" requests are removed and "newer" requests are added to the request queue 352.

In block B430, the policy system times out i.e. a response 338 is not received from the context handler 330 due to a delay, an abnormal condition occurs or if the context handler 330 or the PDP 332 are unavailable, unable or overloaded to provide a response. In block B432, the learning engine execution module 360 is notified to use the timeout path 368.

In block B434, the learning engine execution module 360 uses data from the training module 356 to predict a response that is also logged. The predicted response is also provided to the veto rules module 358, in block B438. The predicted response is compared with stored veto rules. If the predicted response is not rejected by veto rules, then in block B440, the predicted response is provided to the PEP 324.

If the predicted response is vetoed, then in block B442, the request is denied and communicated to the PEP 324 in block B442. Thereafter, the process ends.

As described above, accelerator 316 uses deep machine-learning techniques when a PDP 332 is operating normally to train a model for predicting high confidence/low risk decisions, involving access requests. High confidence decisions are decisions where the model has a high accuracy of making the right decision. Low risk decisions are decisions where the consequence of making an incorrect decision is low. The model is trained continuously and can be used to offload a subset of decisions, especially when the PDP 332 becomes unavailable, unable or overloaded to accept or deny a request.

In one aspect, decisions that are made by the PDP 332 are forwarded to the associator 354 that provides association between requests and responses to the training module 356. The training module 356 may be placed anywhere within a computing network infrastructure and the training may be at a "global level" or a local level for a specific PEP 324. Once the training module 356 has reached a certain training level, then the learning engine execution module 360 can be run against previously made PDP 332 decisions to determine accuracy. In one aspect, decisions made by the learning execution module 360 can be audited for accuracy.

Figure 5:
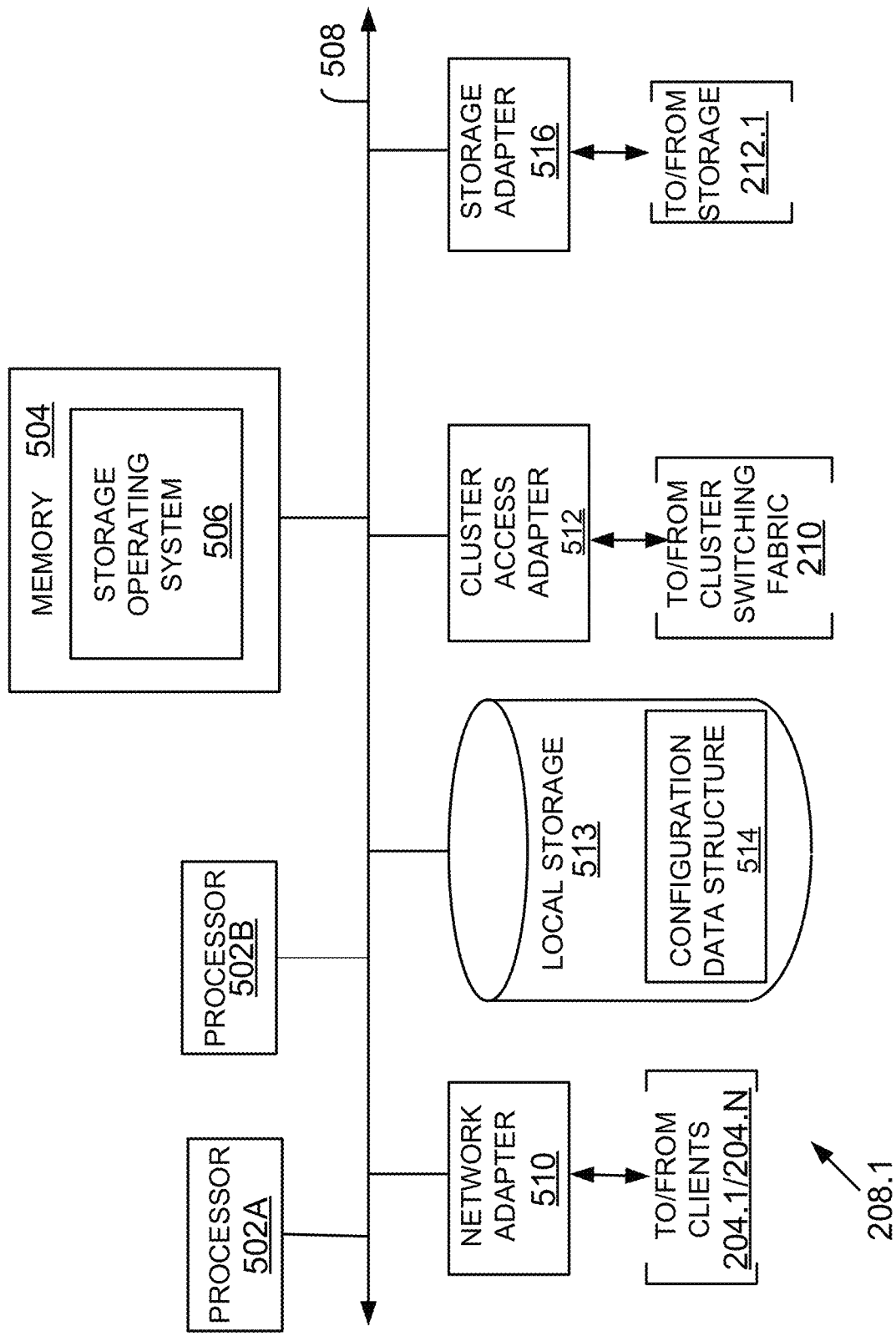
FIG. 5 shows an example of storage system node, used according to one aspect of the present disclosure.

Storage System Node: FIG. 5 is a block diagram of a node 208.1 that is illustratively embodied as a storage system comprising of a plurality of processors 502A and 502B, a memory 504, a network adapter 510, a cluster access adapter 512, a storage adapter 516 and local storage 513 interconnected by a system bus 508. Node 208.1 may be used to provide access to a request using the accelerator 316 and the policy management system 301, described above in detail.

Processors 502A-502B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. The local storage 513 comprises one or more storage devices utilized by the node to locally store configuration information for example, in a configuration data structure 514. The configuration information may include policy level information regarding storage volumes and their associated latency and throughput rates.

The cluster access adapter 512 comprises a plurality of ports adapted to couple node 208.1 to other nodes of cluster 100. In the illustrative aspect, Ethernet may be used as the clustering protocol and interconnect media, although it will be apparent to those skilled in the art that other types of protocols and interconnects may be utilized within the cluster architecture described herein. In alternate aspects where the N-modules and D-modules are implemented on separate storage systems or computers, the cluster access adapter 512 is utilized by the N/D-module for communicating with other N/D-modules in the cluster 100.

Each node 208.1 is illustratively embodied as a dual processor storage system executing a storage operating system 506 (similar to 107, FIG. 1) that preferably implements a high-level module, such as a file system, to logically organize the information as a hierarchical structure of named directories and files on storage 212.1. However, it will be apparent to those of ordinary skill in the art that the node 208.1 may alternatively comprise a single or more than two processor systems. Illustratively, one processor 502A executes the functions of the N-module 104 on the node, while the other processor 502B executes the functions of the D-module 106.

The memory 504 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the disclosure described herein.

The storage operating system 506 portions of which is typically resident in memory and executed by the processing elements, functionally organizes the node 208.1 by, inter alia, invoking storage operation in support of the storage service implemented by the node.

The network adapter 510 comprises a plurality of ports adapted to couple the node 208.1 to one or more clients 204.1/204.N over point-to-point links, wide area networks, virtual private networks implemented over a public network (Internet) or a shared local area network. The network adapter 510 thus may comprise the mechanical, electrical and signaling circuitry needed to connect the node to the network. Illustratively, the computer network 206 may be embodied as an Ethernet network or a Fibre Channel network. Each client 204.1/204.N may communicate with the node over network 206 by exchanging discrete frames or packets of data according to pre-defined protocols, such as TCP/IP.

The storage adapter 516 cooperates with the storage operating system 506 executing on the node 208.1 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on storage device 212.1. The storage adapter 516 comprises a plurality of ports having input/output (I/O) interface circuitry that couples to the storage devices over an I/O interconnect arrangement, such as a conventional high-performance, FC link topology.

Figure 6:
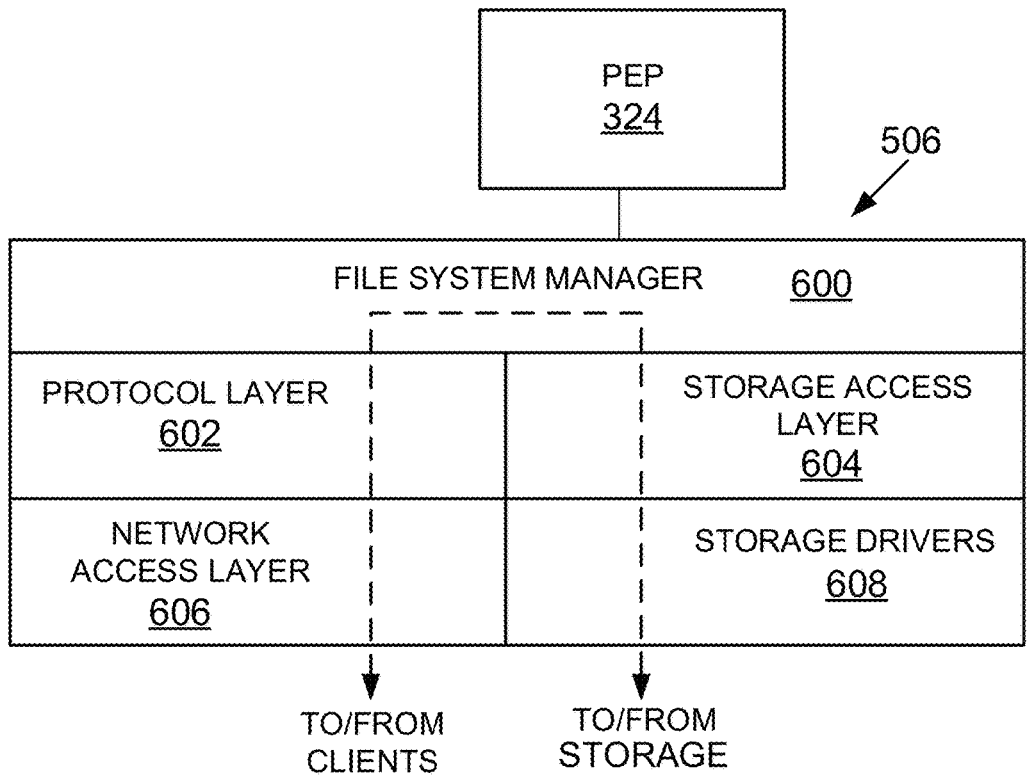
FIG. 6 shows an example of a storage operating system, used according to one aspect of the present disclosure.

Operating System: FIG. 6 illustrates a generic example of storage operating system 506 (or 107, FIG. 1) executed by node 208.1, according to one aspect of the present disclosure. The storage operating system 506 interfaces with the controller 306 operating as a PEP, as described above.

In one example, storage operating system 506 may include several modules, or "layers" executed by one or both of N-Module 214 and D-Module 216. These layers include a file system manager 600 that keeps track of a directory structure (hierarchy) of the data stored in storage devices and manages read/write operation, i.e. executes read/write operation on storage in response to client 204.1/204.N requests.

Storage operating system 506 may also include a protocol layer 602 and an associated network access layer 606, to allow node 208.1 to communicate over a network with other systems, such as clients 204.1/204.N. Protocol layer 602 may implement one or more of various higher-level network protocols, such as NFS, CIFS, Hypertext Transfer Protocol (HTTP), TCP/IP and others.

Network access layer 606 may include one or more drivers, which implement one or more lower-level protocols to communicate over the network, such as Ethernet. Interactions between clients' and mass storage devices 212.1-212.3 (or 114) are illustrated schematically as a path, which illustrates the flow of data through storage operating system 506.

The storage operating system 506 may also include a storage access layer 604 and an associated storage driver layer 608 to allow D-module 216 to communicate with a storage device. The storage access layer 604 may implement a higher-level storage protocol, such as RAID (redundant array of inexpensive disks), while the storage driver layer 608 may implement a lower-level storage device access protocol, such as FC or SCSI. The storage driver layer 608 may maintain various data structures (not shown) for storing information regarding storage volume, aggregate and various storage devices.

As used herein, the term "storage operating system" generally refers to the computer-executable code operable on a computer to perform a storage function that manages data access and may, in the case of a node 208.1, implement data access semantics of a general purpose operating system. The storage operating system 506 can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present disclosure may be utilized with any suitable file system, including a write in place file system.

Figure 7:
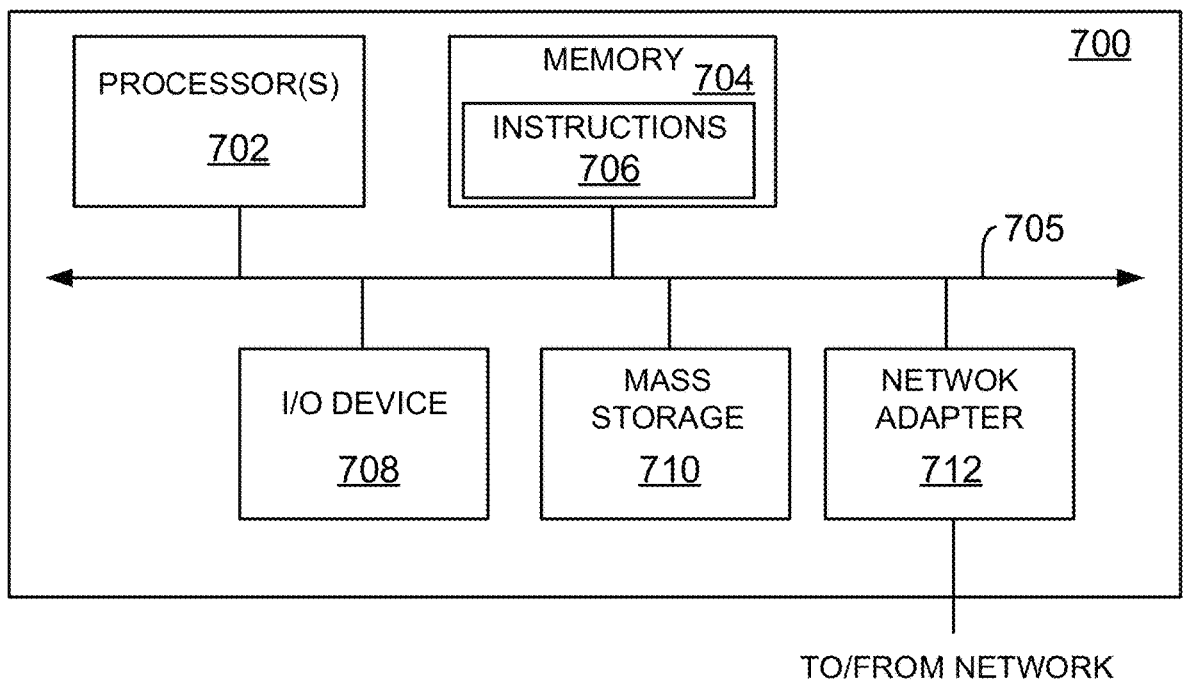
FIG. 7 shows an example of a processing system, used according to one aspect of the present disclosure.

Processing System: FIG. 7 is a high-level block diagram showing an example of the architecture of a processing system 700 that may be used according to one aspect. The processing system 700 can represent host system 102, management console 118, clients 116, 204, 232 and/or 234, cloud manager 119/220, storage system 108/224A/224B, PEP 324, accelerator 316, context handler 330, obligations service provider 326, resource 328 and/or PDP 332. Note that certain standard and well-known components which are not germane to the present aspects are not shown in FIG. 7.

The processing system 700 includes one or more processor(s) 702 and memory 704, coupled to a bus system 705. The bus system 705 shown in FIG. 7 is an abstraction that represents any one or more separate physical buses and/or point-to-point connections, connected by appropriate bridges, adapters and/or controllers. The bus system 705, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 702 are the central processing units (CPUs) of the processing system 700 and, thus, control its overall operation. In certain aspects, the processors 702 accomplish this by executing software stored in memory 704. A processor 702 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 704 represents any form of random access memory (RAM), read-only memory (ROM), flash memory, or the like, or a combination of such devices. Memory 704 includes the main memory of the processing system 700. Instructions 706 implement the process steps of FIGS. 4A-4B described above may reside in and execute (by processors 702) from memory 704.

Also connected to the processors 702 through the bus system 705 are one or more internal mass storage devices 710, and a network adapter 712. Internal mass storage devices 710 may be, or may include any conventional medium for storing large volumes of data in a non-volatile manner, such as one or more magnetic or optical based disks. The network adapter 712 provides the processing system 700 with the ability to communicate with remote devices (e.g., storage servers) over a network and may be, for example, an Ethernet adapter, a Fibre Channel adapter, or the like.

The processing system 700 also includes one or more input/output (I/O) devices 708 coupled to the bus system 705. The I/O devices 708 may include, for example, a display device, a keyboard, a mouse, etc.

Thus, a method and apparatus for managing policy decisions in a networked computing environment have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:
receiving a request from a policy enforcement point (PEP) for an access policy decision for accessing data stored by a storage system;
sending the request to a policy decision point (PDP);
when the PDP provides a response to the request including a policy-based access decision within a time duration:
presenting the response to the PEP to determine whether to grant access to the data for the request; and
providing the request and response from the PDP to a training module for updating stored, machine learned associations between received requests and corresponding responses received from the PDP;
when the PDP does not respond to the request within the time duration:
generating a predicted response to the request including a predicted access policy decision based on the learned associations maintained by the training module;
and
presenting the predicted response to the PEP;
wherein the PEP uses the predicted response to determine whether to grant or deny access to the data.

2. The method of claim 1, wherein when the predicted response violates a veto rule, then the request is denied.

3. The method of claim 1, wherein when the PDP is available, then a response to the request is provided via a fast path.

4. The method of claim 3, wherein the response via the fast path and the request are stored in a data structure for the training device for responding to the future access requests.

5. The method of claim 3, wherein the request is saved at a request queue and provided to a processor executable, associator for maintaining a relationship between the request and the response via the fast path for training responses to the future access requests.

6. The method of claim 1, further comprising: detecting that the predicted response does not violate a veto rule associated with the storage system.

7. The method of claim 1, wherein the request is associated with storage space provided by a cloud provider.

8. A non-transitory machine-readable storage medium having stored thereon instructions for performing a method, comprising machine executable code which when executed by at least one machine, causes the machine to:
receive a request from a policy enforcement point (PEP) for an access policy decision for accessing data stored by a storage system;
send the request to a policy decision point (PDP);
when the PDP provides a response to the request including a policy-based access decision within a time duration:
present the response to the PEP to determine whether to grant access to the data for the request; and
provide the request and response from the PDP to a training module for updating stored, machine learned associations between received requests and corresponding responses received from the PDP;
when the PDP does not respond to the request within the time duration:
generate a predicted response to the request including a predicted access policy decision based on the learned associations maintained by the training module;
and present the predicted response to the PEP;
wherein the PEP uses the predicted response to determine whether to grant or deny access to the data.

9. The non-transitory storage medium of claim 8, wherein when the predicted response violates the veto rule, then the request is denied.

10. The non-transitory storage medium of claim 8, wherein when the PDP is available, then a response to the request is provided via a fast path.

11. The non-transitory storage medium of claim 10, wherein the response via the fast path and the request are stored in a data structure for the training device for responding to the future access requests.

12. The non-transitory storage medium of claim 10, wherein the request is saved at a request queue and provided to a processor executable, associator for maintaining a relationship between the request and the response via the fast path for training responses to the future access requests.

13. The non-transitory storage medium of claim 8, wherein the machine executable code, further causes the machine to: detect that the predicted response does not violate a veto rule associated with the storage system.

14. The non-transitory storage medium of claim 8, wherein the request is associated with storage space provided by a cloud provider.

15. A system, comprising:
a memory containing machine readable medium comprising machine executable code having stored thereon instructions;
and a processor coupled to the memory to execute the machine executable code to:
receive a request from a policy enforcement point (PEP) for an access policy decision for accessing data stored by a storage system;
send the request to a policy decision point (PDP);
when the PDP provides a response to the request including a policy-based access decision within a time duration:
present the response to the PEP to determine whether to grant access to the data for the request; and
provide the request and response from the PDP to a training module for updating stored, machine learned associations between received requests and corresponding responses received from the PDP;
when the PDP does not respond to the request within the time duration:
generate a predicted response to the request including a predicted access policy decision based on the learned associations maintained by the training module;
and present the predicted response to the PEP;
wherein the PEP uses the predicted response to determine whether to grant or deny access to the data.

16. The system of claim 15, wherein when the predicted response violates a veto rule, then the request is denied.

17. The system of claim 15, wherein when the PDP is available, then a response to the request is provided via a fast path.

18. The system of claim 17, wherein the response via the fast path and the request are stored in a data structure for the training device for responding to the future access requests.

19. The system of claim 17, wherein the request is saved at a request queue and provided to a processor executable, associator for maintaining a relationship between the request and the response via the fast path for training responses to the future access requests.

20. The system of claim 19, wherein the machine executable code, further causes to: detect that the predicted response does not violate a veto rule associated with the storage system.

* * * * *